June 17, 1952  P. H. HERRICK  2,601,017
HUBCAP RETAINER
Filed Oct. 7, 1948
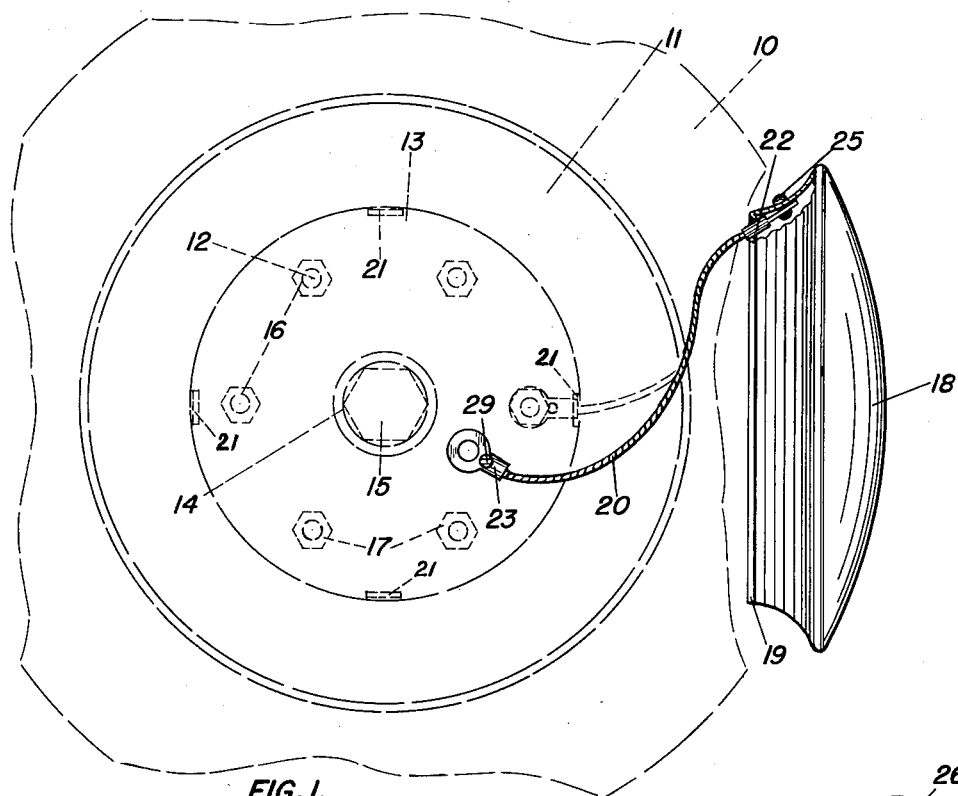
FIG. 1.
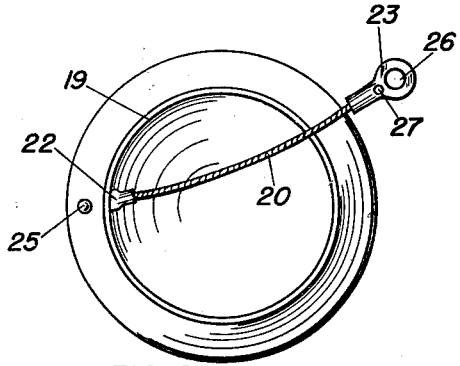
FIG. 2.
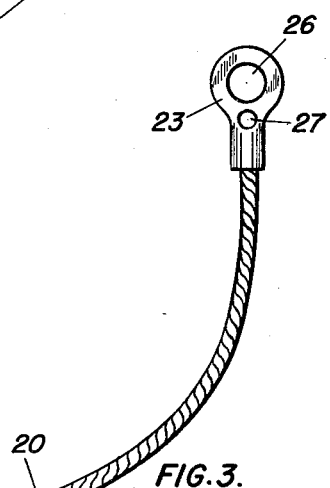
FIG. 3.
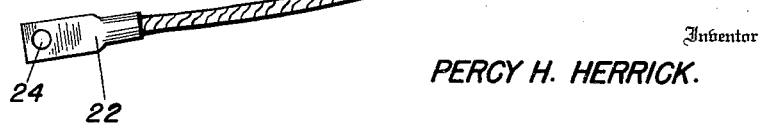
Inventor
PERCY H. HERRICK.
By Howard J. Whelan.
Attorney Patented June 17, 1952

2,601,017

UNITED STATES PATENT OFFICE 2,601,017

HUBCAP RETAINER

Percy H. Herrick, Baltimore, Md., assignor to Products Manufacturing Co., Inc., a corporation of Maryland Application October 7, 1948, Serial No. 53,169

2 Claims. (Cl. 301—108)

This invention refers to vehicle wheel accessories and more particularly to the hub caps used on automobile wheels for ornamental and practical reasons.

The conventional hub cap or plate on the detachable wheel of an automobile is made of an attractive finished plate dished-out or dome shape, externally developed to add to its appearance and also allow sufficient room for the axle or hub assembly to project into it, without obstructing its placement on the wheel. The hub cap is snapped on the wheel body surrounding the hub in a recess provided therefor and having projecting clips for resiliently engaging and holding the hub cap or plate. The hub cap or plate is removable to permit access to the usual bolts holding the detachable wheel and rim to the hub assembly. The removability of the hub cap while necessary, has the objection, that it permits the plate to be detached completely from the wheel by accident or intention, thereby making it liable to loss. This loss is of frequent occurrence. An automobile travelling on the highway may shake the plate loose and lose it on the roadway without warning of the fact until too late to recover the plate. An unauthorized individual can readily remove the plate and retain it for his own purposes, or the owner may detach it during the fixing of a tire and misplace it or forget to replace it on the wheel. In any case, the owner loses the hub cap. This loss of a hub cap detracts from the appearance of the wheel and the protection afforded by it. In this invention, the hub cap or plate is rendered secure at all times by having it connected to the hub assembly by a retainer preferably a flexible hardened cable or chain long enough to hold it quasi-permanently to the wheel, yet permitting it to be moved away for access to the bolts or hub, as may be required.

It is therefore an object of the invention to provide a new and improved hub cap unit that may be quasi-permanently attached to the hub assembly in such a way as to permit the cap to be manipulated for work, inspection or repair to be done to the wheel without completely detaching the cap from the assembly or interfering with such work.

Another object of the present invention is to provide a new and improved hub cap unit that will avoid one or more of the disadvantages and limitations of the previous art.

An additional object of the herein described invention is to provide a new and improved hub cap or plate unit that will be practically unloseable after being placed in position on a vehicle wheel.

An additional object of the present invention is to provide a means for holding a hub cap to a vehicle wheel through the use of a hardened retainer which cannot be cut by any available tools and which will prevent the theft of the hub cap from said vehicle wheel.

Other objects will become apparent as the invention is more fully set forth.

For a comprehensive explanation of the invention, its principles and objects, reference is made to the accompanying drawings. These drawings in conjunction with the following description outline a particular form of the invention by way of example to enable its features to be appreciated; while the claims appended hereto serve to emphasize the scope of the invention.

In the drawings:

Figure 1 is a perspective view of a hub cap or plate unit embodying this invention shown attached to a portion of an automobile wheel, in a position providing access to the hub assembly of the wheel;

Figure 2 is a detail of the hub cap or plate unit looking at the inside face of the hub cap, and Figure 3 is a detail of the flexible coupling cable used with the unit.

Similar reference numerals refer to similar parts throughout the drawings.

Referring to Figure 1, a conventional automobile tire 10 is shown attached to the conventional wheel web 11. The studs 12 serve to secure the web 13 to the hub assembly in a conventional manner. The web 13 has a hole 14 in its central portion for the projection of the hub 15 of the assembly, other spaced holes 16 arranged on a circle around the hole 14 are provided for the studs 12 to pass through the holes 16 in the web 13 of the assembly 11. Hexagonal nuts 17 adjustably attach the wheel to the studs 12. The hub cap or plate 18 is mounted and held on the web 13 by pressing its inturned rim flange 19 into the clips 21 attached to the assembly 11 in the usual manner. In addition the hub cap or plate 18 has a hardened cable or chain connection 20 with end lugs 22 and 23 secured at each end thereof. The lug 22 is pivotally riveted to the flange 19 on its inner face, a hole 24 being provided in the lug for the rivet 25 to pass through for the attachment. The other lug 23 is enlarged so as to allow for the drilling of plural holes 26 and 27. The hole 26 is large enough to permit the lug to be placed on one of the studs 12 and held there by a nut 17, so that the cable or chain will be held thereon. The full line in Figure 1, shows lug 23 before attachment to the bolt and the dotted line shows the lug on the bolt. This is a semi-permanent connection as it must be detached every time the wheel 10 is removed from the hub assembly 11. The hole 27 is used for a small screw 29 threadable in a suitably placed tapped hole in the web 13 for holding the cable or chain with hub cap or plate attached, quasi-permanently thereto. The use of the screw 29 enables the hub cap or plate 18 to hang free from the web 13 without being detached therefrom. This permits access to the nuts 17 and studs 12 without interference from the hub cap 18. If the hub cap or plate 18 should become loosened from the clips 21 and fall off the membrane and wheel, it will be retained by the cable connection 20 and held there until replaced. The noise of the hub plate unit banging against the wheel revolving at high speed will soon call the attention of the driver of the vehicle to its partial detachment. This will cause him to remedy the defect and replace the hub cap or plate in its proper place on the wheel. The unit being attached to the membrane at all times, keeps the hub cap or plate accessible for replacement in a convenient way. The arrangement is simple and inexpensive, but none the less desirable. It prevents the user from forgetting to mount the hub cap or plate, after he has placed the wheel on the hub assembly. It keeps the cap or plate out of the dirt or mud or from being damaged on the ground, as ordinarily happens with the conventional hub cap or plate. It enables the inside of the cap or plate to be used for holding the nuts 17 as they are detached during wheel removal, and thus render them available when needed. Ordinarily these nuts 17 are left on the ground beside the wheel and frequently become lost or dirty. The owner also feels the satisfaction of the confidence of knowing that his hub caps or plates will be on the automobile when he returns after leaving it parked unsupervised for some time.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. The combination with a detachable wheel for a vehicle, said wheel having a central web and a plurality of bolts extending through the web to secure the wheel to the vehicle, of a hub cap, a flange on said hub cap, flexible means on said central web to receive said cap, a flexible cable having one end secured to said flange, and means for selectively securing the opposite end of said cable to said web in a plurality of positions.

2. The combination set forth in claim 1, said selective securing means comprising a lug at the end of said cable having an opening therein adapted to straddle one of said mentioned bolts, when said hub cap is in mounted position on the wheel, said cable also having an additional opening, and a set screw receivable in said second opening to secure said cable to said web when said hub cap is dismounted from the wheel.

PERCY H. HERRICK.

REFERENCES CITED

The following references are of record in the file of this patent:

UNITED STATES PATENTS

| Number | Name | Date |
|---|---|---|
| 1,958,019 | Reasoner | May 8, 1934 |
| 2,217,116 | Hunt | Oct. 8, 1940 |
| 2,291,597 | Goeske | Aug. 4, 1942 |